United States Patent [19]

Biverot

[11] Patent Number: 5,479,185
[45] Date of Patent: Dec. 26, 1995

[54] DISPLAY ARRANGEMENT

[75] Inventor: Hans Biverot, Hässelby, Sweden

[73] Assignee: Celsius Tech Electronics AB, Jarfalla, Sweden

[21] Appl. No.: 386,127

[22] Filed: Feb. 7, 1995

Related U.S. Application Data

[63] Continuation of Ser. No. 162,609, Dec. 7, 1993, abandoned.

[30] Foreign Application Priority Data

Dec. 9, 1992 [SE] Sweden .................. 9203703

[51] Int. Cl.$^6$ ........................................ G09G 3/36
[52] U.S. Cl. ............................... 345/6; 345/32; 345/87
[58] Field of Search ........................... 345/4, 5, 6, 7, 345/8, 32, 87; 359/54, 55; 348/51, 52, 53, 54, 55, 56, 521; 380/54

[56] References Cited

U.S. PATENT DOCUMENTS

| | | | |
|---|---|---|---|
| 3,860,752 | 1/1975 | Adler et al. | 345/56 |
| 4,670,744 | 6/1987 | Buzak | 345/6 |
| 4,908,876 | 3/1990 | DeForest et al. | 382/54 |
| 4,967,268 | 10/1990 | Lipton et al. | 455/603 |
| 5,113,272 | 5/1992 | Reamey | 345/4 |

FOREIGN PATENT DOCUMENTS

| | | |
|---|---|---|
| 0518834 | 12/1992 | European Pat. Off. . |
| 79/00308 | 7/1979 | WIPO . |
| 91/15930 | 10/1991 | WIPO . |

*Primary Examiner*—Tommy P. Chin
*Assistant Examiner*—Doon Chow
*Attorney, Agent, or Firm*—Pollock, Vande Sande & Priddy

[57] ABSTRACT

The invention relates to a display arrangement for displaying a three-dimensional image to an observer. The arrangement comprises a first display element ($D_1$) arranged at a distance from the observer and a second display element ($D_2$) arranged in the field of view between the observer (OB) and the first display element ($D_1$) in the immediate vicinity of the observer. To produce a complete volume image in three dimensions, the image volume is sampled during a time interval corresponding to the typical integration time of the observer. After processing, the sample information is utilized partly in the first display element ($D_1$) for displaying a first subset of image information included in the three-dimensional image and partly in the second display element ($D_2$) for displaying a second subset of image information included in the three-dimensional image.

14 Claims, 4 Drawing Sheets

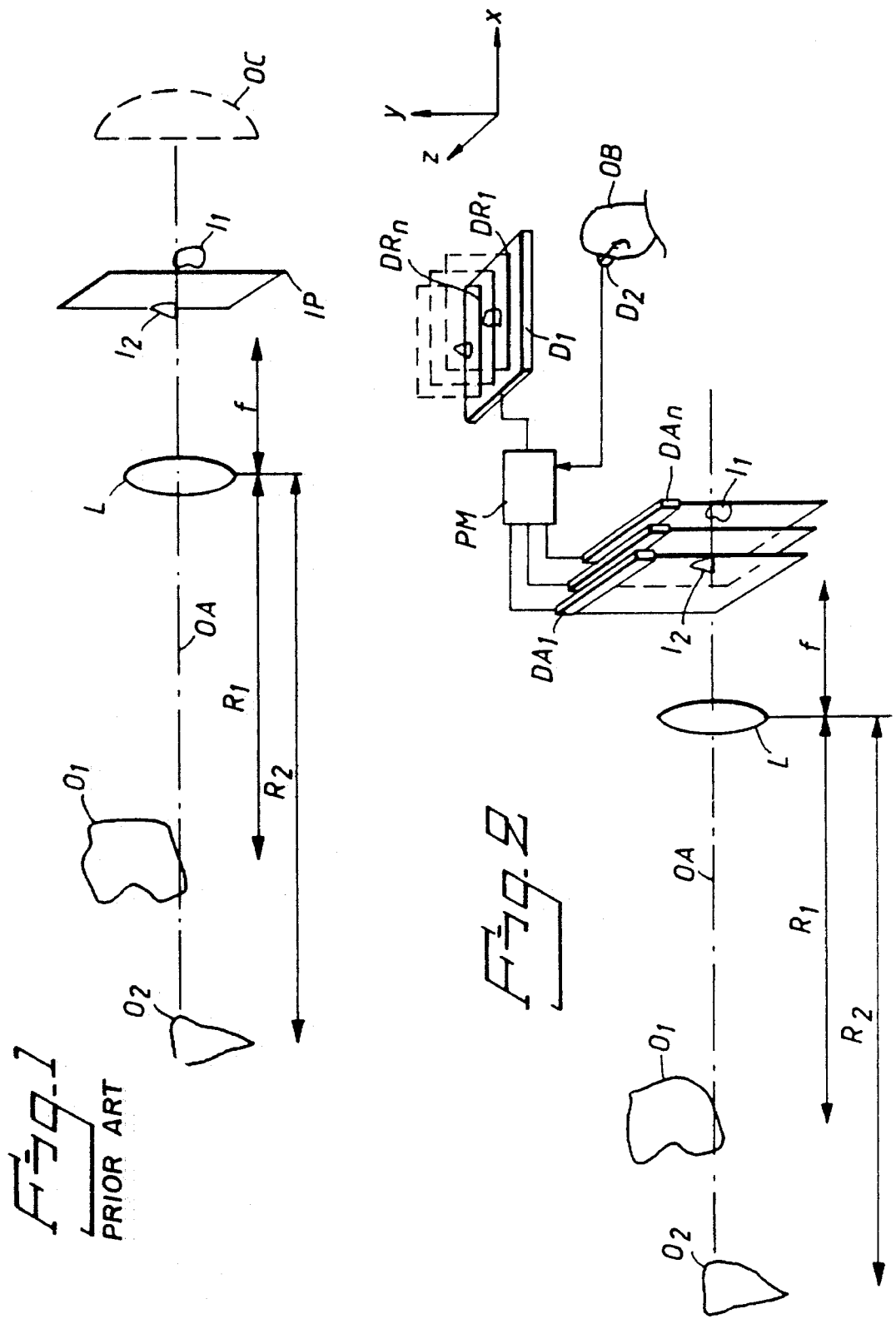

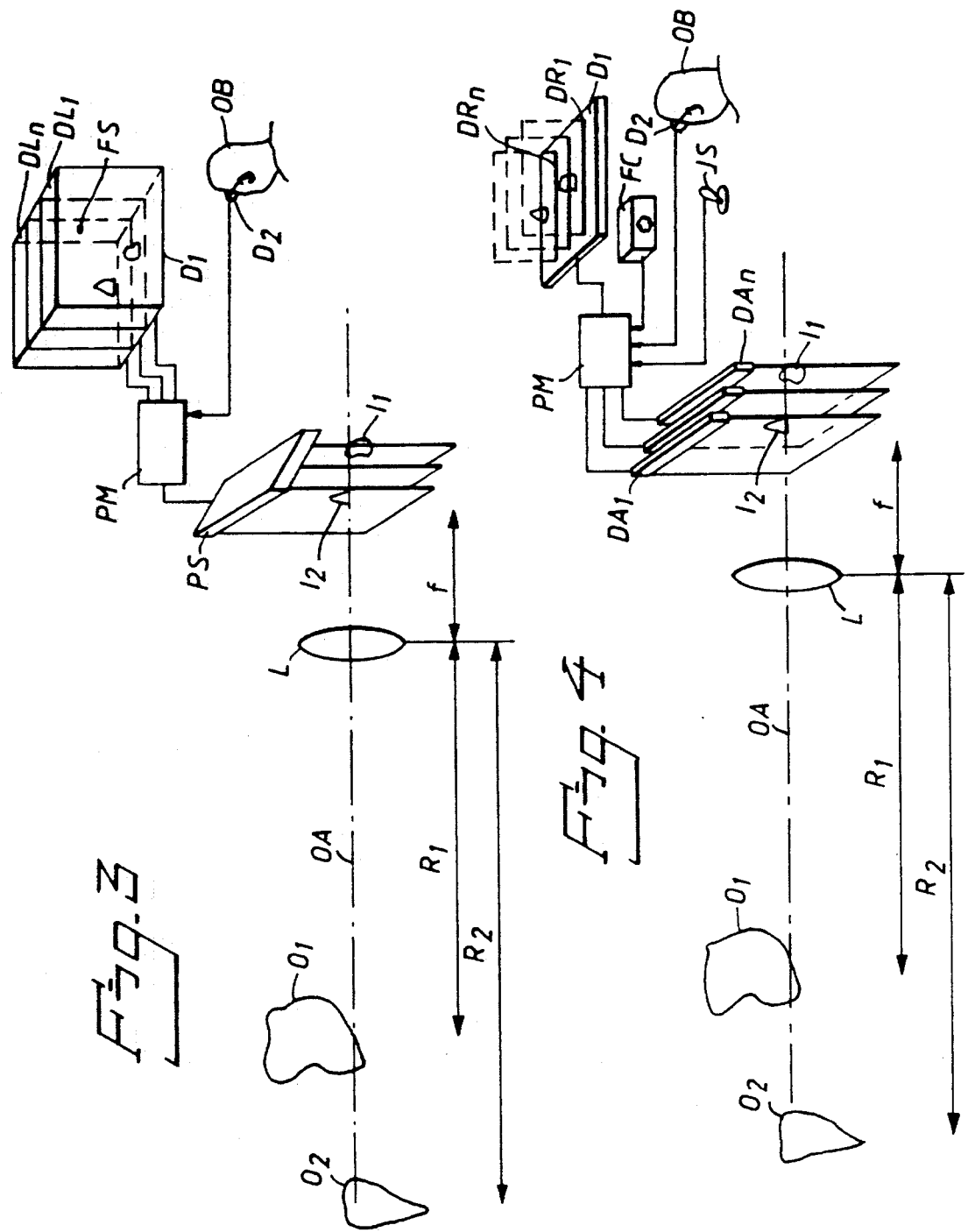

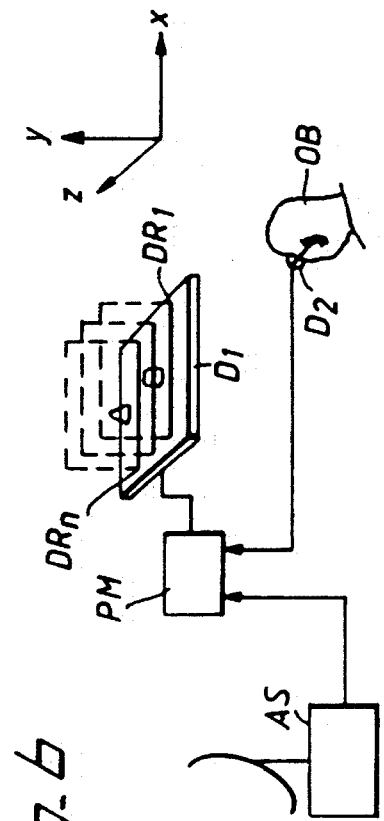
Fig. 6
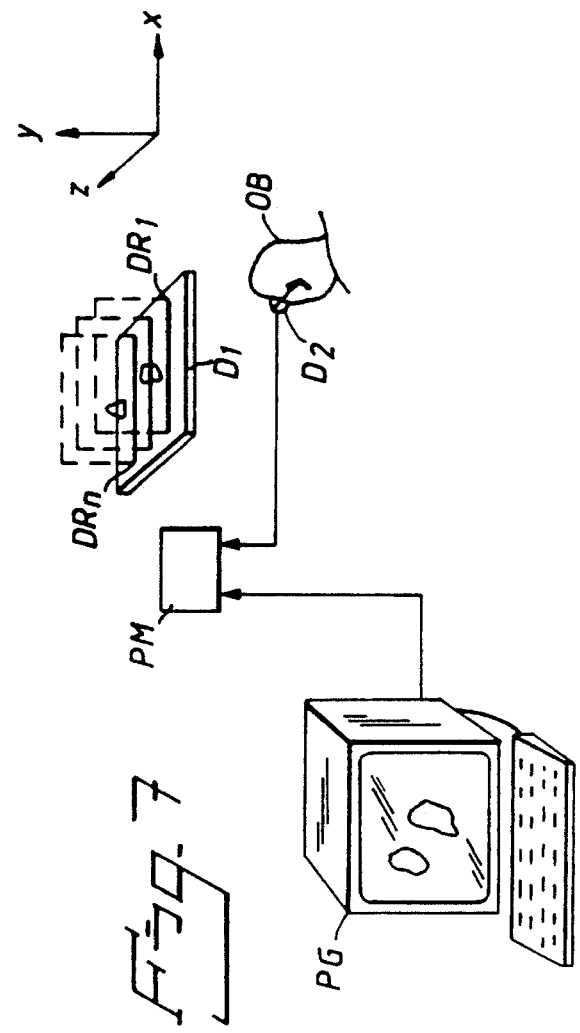
Fig. 7

DISPLAY ARRANGEMENT

This application is a continuation of Ser. No. 08/162,609, filed on Dec. 7, 1993, now abandoned.

FIELD OF THE INVENTION

The present invention relates to an apparatus for displaying a three-dimensional image to an observer, comprising a first display element arranged at a distance from the observer, a second display element arranged in the field of view between the observer and the first display element in the immediate vicinity of the observer, and means for mutual synchronization of the first and second display element.

BACKGROUND OF THE INVENTION

An apparatus of the abovementioned type, primarily for displaying two-dimensional images, is already known through our Swedish Patent Application 9101778-0, corresponding to allowed U.S. patent application Ser. No. 07/897,471, now U.S. Pat. No. 5,327,153. A three-dimensional display is produced in this case by supplying to a two-eyed observer a separate part-image for each eye, so-called stereo image pair. However, three-dimensional display according to the abovementioned patent application has certain limitations. Due to the fact that the image is built up of only two part-images, there is very limited information about the three-dimensional image seen from one direction, and the apparatus requires that the observer have two eyes.

Optical imaging in the traditional sense can be considered as a projection of a three-dimensional aerial image on an image plane, for example a ground glass, a film or the retina of the eye. If there is sufficient depth of field within the object space of interest when it is imaged on a plane, this is not felt to be a serious restriction. In this way, however, only a subset of the information content of the complete three-dimensional image volume is made use of. As a rule, each image plane is accessible to an observer by refocusing, whereby only one plane at a time can be registered. This is especially pronounced in optical systems with high light-gathering power and therefore little depth of field such as, for example, a microscope or electrooptical instrument with some image-converting component and a display screen, for example image intensifier, TV camera, IR camera and so forth.

Traditional optical imaging is passive, that is to lacking illumination of the target with some time tagging. It is thus not possible to measure the distance to different objects with the aid of time measurement. One possibility is to measure the angle to the target from two positions, for example within one lens aperture. The image of the target can be set to be sharp by shifting a lens. The greater the range of angles received from the object, that is the larger the lens in relation to the focal length, the less the uncertainty in depth and therefore the less the "depth of focus" obtained. Distant parts are "pressed together" which is the result of the lens formula. According to the lens formula, it holds true that $a \cdot b = f^2$, where a is the object distance to the front focal point, b is the image distance from the rear focal point and f is the focal length. An example of passive imaging with possible improvements according to this method is a microscope with a large depth of field and good reading possibilities on a three-dimensional screen.

Active sensors of the radar echo type with some form of time tagging of the transmitted signal provide a possibility for linear scales in all three dimensions, distance, angles in azimuth and elevation. Examples of this system are radar, laser radar, sonar and so-called "gated viewing". As another example of a use of active sensors, shadow projection methods with linear image synthesis, for example X-ray tomographs, magnetic cameras and so forth can be mentioned, which are mainly used in medical diagnostics.

In the text which follows, actual bodies in the environment are called "objects". Images of these, for example generated by light, IR radiation, radar, X-ray, acoustic waves and so forth, are called "primary images". A "primary image" can also be completely synthetic. A "display" which makes a "primary image" visible to the observer is then produced with the aid of two separate "display elements".

SUMMARY OF THE INVENTION

The aim of the present invention is to produce a display apparatus which generates complete volume images in three dimensions and thereby an almost ideal three-dimensional experience for the observer and which does not exhibit the abovementioned limitations.

The aim of the invention is achieved by an apparatus which is characterized in that it comprises elements for generating a primary image with three-dimensional image information and elements for processing the three-dimensional image information for dividing the image information between a first and a second display element, the processed image information being utilized partly by the first display element for displaying a first subset of image information included in the three-dimensional image and partly by the second display element for displaying a second subset of image information included in the three-dimensional image during a characteristic integration time for the observer, by which means the observer, on observing the two synchronized display elements in his field of view, perceives a three-dimensional image. The invention permits recording and reproducing of volumes in three dimensions by utilizing distributed display elements and generating and processing a primary image. By recording and displaying a series of images according to the above, moving 3-D images can be reproduced with a selectable time scale. Storage in a storage medium such as a tape player or equivalent for later replaying and displaying is possible. The primary image with three-dimensional image information can be a reproduction of the physical space or can be constituted of data information obtained through an active sensor or from an image generator for synthetic image generation.

According to an advantageous embodiment, the present invention is characterized in that the processing elements comprise an image overlay unit for overlaying one or more images, for example an aiming means, on the three-dimensional image. By image overlay in the three-dimensional image display, among other things, sights with very attractive characteristics can be produced. In contrast to, for example, helmet sights, the head position of the observer does not need to be fed in. The field of view can be made optionally large and the observer can freely move his head. The aiming means is overlaid free of parallax on an optional point at the current distance. If desired, an overlay of a number of images or real background can be made on the three-dimensional image display.

BRIEF DESCRIPTION OF THE PREFERRED EMBODIMENT(S)

The invention will be described in greater detail below with the aid of examples, referring to attached drawings, in which:

FIG. 1 shows conventional optical imaging as a projection of a three-dimensional aerial image on an image plane;

FIG. 2 shows a first embodiment of an apparatus according to the present invention for displaying a three-dimensional image including display rulers in the first display element;

FIG. 3 shows a second embodiment of the present invention for displaying a three-dimensional image comprising a multi-layer display in the first display element;

FIG. 6 shows a fourth embodiment of the present invention for displaying a three-dimensional image comprising an active sensor, and FIG. 7 shows a fifth embodiment of the present invention for displaying a three-dimensional image comprising an image generator for synthetically generating a primary image.

DETAILED DESCRIPTION OF THE PREFERRED EMBODIMENT(S)

Figure 4A:
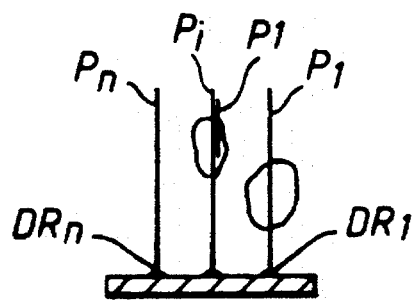
FIG. 4 shows a third embodiment of an apparatus for displaying a three-dimensional image according to which the displayed three-dimensional image contains an overlaid image, FIG. 4a showing a diagrammatic vertical section through the first display element in the direction of the optical axis and FIG. 4b showing a front view of the image plane in which the overlaid image is overlaid.

FIG. 1 shows conventional optical imaging. Using a collecting lens L, a first and a second object $O_1$ and $O_2$, respectively, are imaged on an image plane IP as projections of a three-dimensional aerial image $I_1$ and $I_2$, respectively. The image plane can consist, for example, of a ground glass. Alternatively, the image plane can consist of a film or the retina of the eye. An observer advantageously sees the image in the image plane through an ocular OC which is diagrammatically indicated by dashed lines in FIG. 1. The focal length of the collecting lens L has been designated by f and the distance between object and collecting lens by $R_1$ and $R_2$, respectively. Only a subset of the information content of the three-dimensional primary image volume is utilized corresponding to the depth of focus of the system. By refocusing, a number of image planes IP can be sharply registered, but only one at a time.

FIG. 2 shows an apparatus according to the invention for displaying a complete volume image in three dimensions. In correspondence with what has been described with reference to FIG. 1, there are two objects $O_1$ and $O_2$ at a distance $R_1$ and $R_2$, respectively, from the collecting lens L measured along the optical axis OA of the collecting lens. Instead of a ground glass or similar in the image plane, a plurality of detector arrays $DA_1$–$DA_n$ are arranged for sampling the primary image volume. The samples from the detector arrays are processed in processing members PM. The processing members can comprise, among other things, a frame buffer, an image overlaying unit, image modifying elements and image information separating elements. The processed samples are then supplied to a first display element D1 and a second display element $D_2$. The first display element consists of a plurality of display rulers $DR_1$–$DR_n$ arranged in parallel with one another. For an observer OB equipped with the second display element $D_2$, the first display element $D_1$ is arranged within his field of view.

In the embodiment shown in FIG. 2, a respective detector array $DA_1$–$DA_n$ is allocated to each two-dimensional image plane which will be scanned in the primary image volume. The detector arrays are arranged in such a manner that they do not block the incident rays of light. This can be managed by time division and geometric displacement in the transverse direction between the detector arrays. Starting with the pixel size of the detectors and the associated depth-of-field requirement, a minimum number of image planes can be determined into which the image volume must be divided in order to retain sharpness. Instead of a plurality of detector arrays, a single obliquely positioned two-dimensional image sensor, for example a CCD matrix, can be used which is made to sweep through the primary image volume. A number of lines in the image sensor each sense their frame in their respective focusing plane.

The samples obtained by scanning the image volume are advantageously stored after processing as a three-dimensional tensor in a frame buffer, not shown, included in the processing members. Processing in connection with storage has the aim, among other things, of adapting the image information items to the first and second display element in question. The image information items are hereby divided into two subsets in the element separating the image information which is included in the processing members. In the image-modifying element, the image information can be transformed, for example, between different types of projection or filtered, for example, for bringing out the sharper parts of the image and placing them at the "correct" depth.

The functions produced by the processing members PM can be carried out by known means which is why a more detailed description is not given here.

According to the example shown in FIG. 2, the second display element $D_2$ is constituted of a pair of scanning goggles. The two display elements are mutually synchronized and display the three-dimensional image as will be shown in accordance with the text following.

However, it is first established, in order to facilitate the understanding of the description following, that a two-dimensional image can be seen to be built up of a number of minimum resolution elements for the observer, called pixels. The image can be thought to consist of a distribution of these pixels in two dimensions. Thus, the two-dimensional image can be viewed as a number of pixels, each of which is defined by a pixel position given by two angle coordinates relative to the observer, and an information item belonging to each pixel in the form of intensity, color, polarization and so forth at each point. A system in which all pixels emit information within a time interval shorter than the integration time of an observer, for example shorter than the integration time of the human eye, is perceived as a flicker-free image by the observer.

A three-dimensional image can be considered to be built up by a number of pixels which we call "trixels" in the text which follows, that is to say three-dimensional picture elements as distinct from two-dimensional picture elements called "pixels". Each trixel is associated with three coordinates, all of which will be activated at least once within a time T of the order of magnitude of the integration time of the eye. A typical value for the integration time of the eye is approximately 10–20 ms. It is therefore sufficient to activate each address within a shorter time t of the total integration time.

A collection of possible distribution alternatives between the first and second display elements follows below:

|    | First display element | Second display element |
|----|----------------------|------------------------|
| 1. | i, x1, x2            | x3                     |
| 2. | x1, x2, x3           | i                      |

|   | First display element | Second display element |
|---|---|---|
| 3. | i, x1 | x2, x3 |
| 4. | x1, x2 | i, x3 |
| 5. | i | x1, x2, x3 |
| 6. | x1 | i, x2, x3, | where x1, x2, x3 represent three coordinates of one point or "trixel" and i represents the information content of the trixel point in question. The coordinates x1, x2, x3 can be permutated between themselves for each case.

In each trixel symbolized by the vector R (x,y,z) in the image space, a signal sampled over the integration time T is sent out to the observer with specific information-bearing characteristics such as intensity, color, polarization and so forth. The total amount of addressed trixels then builds up a complete image by interaction between the first and second display element $D_1$, $D_2$. In analogy with conventional TV technique, each image can represent a subset, for example half the image content according to the "interlace" principle in order to prevent arising of flicker. In this manner, the time bandwidth of the system can be kept down, which is important in transmission over the distribution network, particularly for wireless transmission. The number of physically implemented trixels in the first display element can be limited to one point, one row, one surface or a number of planes depending on the system solution. Different intermediate forms are also possible such as, for example, groups of rows and so forth. According to the embodiment shown in FIG. 2, the trixels physically implemented in the first display element are limited to one plane. The complete image is obtained by interaction with the second display element which supplies the remaining image information with the aid of, for example, deflectors. According to the embodiment shown in FIG. 2, the image is spread out or expanded in the y direction by the second display element.

Each display ruler in the first display element is supplied with pixel information and an angle coordinate corresponding to the respective associated image plane while the second display element, at the same time, is supplied with the second angle coordinates. Images from each "luminous" display ruler are reproduced within a time which, at the most, corresponds to the integration time of the observer. The result is that each selected image plane is transformed to a certain associated projection plane. All image planes are perceived as sharp at the same time. A depth illusion is created partly due to parallax between the eyes of the observer and partly due to the relative movement between part images upon movement of the head since the display rulers are placed at a certain distance from one another in depth. To bring out the sharp parts in each image plane, the image information items can be processed in the processing members before being displayed. The combination of display elements with display rulers and scanning goggles as described is suitable for creating a microscope with large depth of field and depth illusion, even monocularly. Such a microscope offers possibilities for improvement with respect to workplaces and other ergonomics.

FIG. 3 shows a second embodiment of the display arrangement. In this case, as compared to FIG. 2, the first and second display element has been replaced by other types. The first display element $D_1$ now comprises a multi-layer display, for example of the liquid crystal type, and the second display element comprises so-called "switch goggles" comprising very fast shutters. In FIG. 3, three layers $DL_1$–$DL_3$ are shown. Recording of the primary-image volume in the case of passive optics can be done in the same manner as in the embodiment described first, but instead of a plurality of detector arrays, an oblique two-dimensional picture sensor PS is shown here which sweeps through the primary-image volume. Recording of the object volume for active systems can be done in different ways depending on system characteristics. Some examples will be described below with reference to FIGS. 6 and 7. Each coordinate point in three dimensions is read in, for example from a 3-D radar, as two angles and a distance of corresponding radar lobes, after which a complete solid image is built up in the memory. In a corresponding manner, two-dimensional images are obtained as slices from a computer tomograph. The multi-layer display $DL_1$–$DL_3$ is scanned layer by layer by a flying spot FS without information, at the same time as the switch goggles are modulated very quickly, which entails that each layer is perceived to contain its corresponding image content from the aerial image $I_1$ and $I_2$, respectively. The pixel information is supplied to the three-dimensional image via the switch goggles while the position in three dimensions is determined by the flying spot. The sharper parts of the image can be brought out and thereby moved to the "correct" depth by high-pass filtering of the signal which modulates the switch goggles.

Figure 4B:
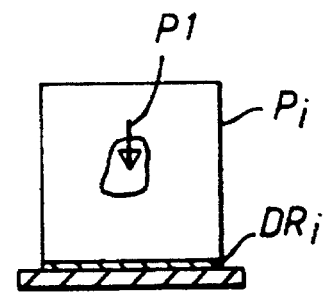

FIGS. 4, 4a and 4b show a third embodiment in which a symbol image is overlaid on the three-dimensional image for forming a double image. FIG. 4a shows a diagrammatic vertical section through the first display element $D_1$ included in the arrangement according to the invention, and FIG. 4b shows a front view of the image plane in which the symbol image is overlaid. The arrangement can be of the type which has been described with reference to FIG. 2 for passive optical systems supplemented by a further function included in the processing members PM which adds the image which will be overlaid. The overlaid image can comprise, for example, an aiming mark, crosshairs, grid or the like. In the shown embodiment, the double image is designed as a sight containing, partly, a plane with aiming mark PI and, partly, a coincident plane $P_i$ with an environmental image which is "focused", that is selected as the sharpest for the current distance. This creates a parallax-free overlaying of the aiming means on an optional point at the current distance. The display arrangement can thereby be included in a sensor which is utilized as aiming means.

The aiming mark can be seen as a position specification in the primary image which corresponds to an angle specification with respect to the environment. An alternative is to consider the environment directly and create an angle adaptation. Two aiming marks are displayed each in their plane, whereby an aiming specification is obtained by sighting between the marks with respect to the environment. A platform (not shown) on which the display apparatus is mounted can thereby be aligned towards a certain bearing and elevation relative to the environment.

With position specification in the primary image, the aiming point is controllable in azimuth, elevation and depth by the observer to a desired point in the terrain by means of an aiming element JS analogous to a joystick and a focusing controller FC coupled to the arrangement. In distinction from, for example, helmet sights where the viewer or observer aims with his head, the head position of the observer does not need to be fed in. In the display arrangement according to the invention, there is already a reference to the surroundings in the placement of the first display element and the observer can move his head freely. However, the present invention does not exclude that the head movements of the observer are utilized for aiming and that a further control element is arranged for selection of the image plane.

Figure 5:
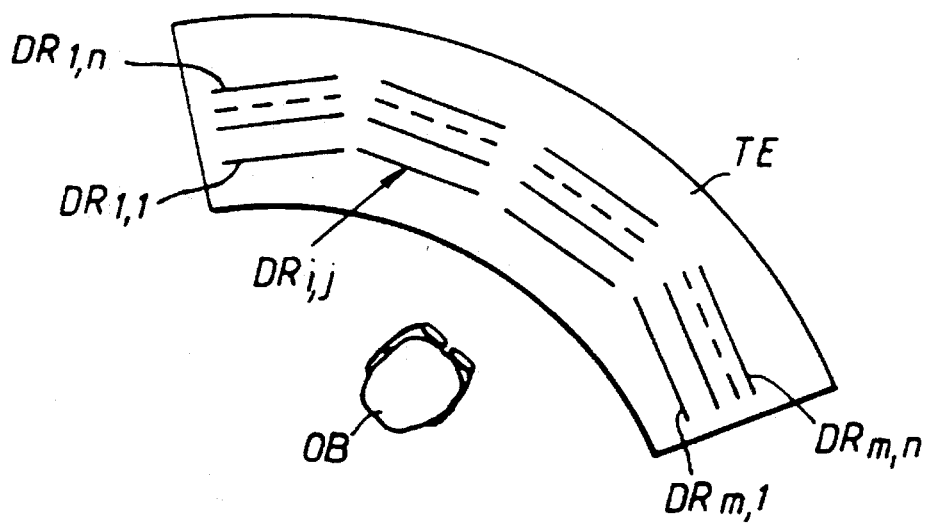
FIG. 5 shows a third embodiment of an apparatus for displaying a three-dimensional image and allowing for a large solid angle.

A display arrangement for, for example, pilots can comprise, as diagrammatically shown in FIG. 5, display rulers mounted around the observer, whereby bulky so-called "head-up displays" are not required. According to FIG. 5, an observer OB is shown seen from above sitting in front of a number of display rulers $DR_{ij}$ where i=1, 2 ... m, j=1, 2 ... n and m is the number of display rulers in the lateral direction and n is the number of display rulers in depth. The display rulers are arranged on the surface of a panel TE. The field of view can be made optionally large depending on the sensor arrangement and the pilot can move his head freely without affecting the alignment of the aiming mark with a detected target. It is completely possible to generate several aiming marks each of which will feed in data to an associated calculating program for calculating measures. A display arrangement according to the above, coupled to reconnaissance/assignment tasks, improves the possibilities for early detection and quick measures and simultaneous processing of a number of targets. A number of types with electronic signal output can be used as sensors, for example TV and IR. The sensors can also consist of non-optical sensors such as radar or acoustic sensors. As an alternative, aiming marks can be generated for direct aiming towards visible objects in the environment according to the above.

In the embodiment shown in FIG. 6, generation of the primary image is carried out with the aid of an active sensor AS in the form of, for example, a radar. The primary image obtained can thereby be made up of data information in the form of, for example, electrical signals describing the primary image with its three-dimensional image information. From the processing members PM and up to the observer OB, the equipment according to FIG. 6 can be and is identical with that which has been described with reference to FIG. 2. For example, a normal 3-D radar can be used for generating a primary image of an object volume registered on the radar. Transmitting and receiving lobes define two coordinates in the form of angles. The time delay provides the third coordinate, that is distance. In this case, a recording is carried out in a polar coordinate system. Transformations can then be carried out to the representation which passes following elements.

According to the embodiment shown in FIG. 7, the primary image is synthetically generated by means of a picture generator PG. For the rest, the embodiment corresponds to what has been described with reference to FIG. 2. In this case, there is no real object, but the primary image is created directly by the picture generator which expediently but not necessarily constitutes a part of a computer.

The invention is not in any way limited to the illustrative embodiments described, but the scope of the invention as defined by the patent claims provides for a variety of embodiments. Amongst others, there is a great choice of possibilities in the interaction between the two display units for creating the three-dimensional image and the construction of the two display elements can thereby be varied within wide limits.

A number of principles for distribution over time T of the trixel excitation is also conceivable. The number of possible parallel video channels for individual trixels determines the accessible active time for each picture element.

Different types of distribution to part-images, compare "interlace" in TV, for reduced bandwidth and reduced flicker are possible. Systems with part-images within a number of intervals T are conceivable in analogy with TV fields. Furthermore, a number of points can be excited in parallel in the first display arrangement.

The arrangement also entails that different images are displayed to a group of observers in analogy to what has been described in Swedish Patent Application 9101778-0, (U.S. Ser. No. 897,471, U.S. Pat. No. 5,327,153).

With regard to the embodiment according to FIG. 5, a number of sensors suitable for application were exemplified. Quite generally, sensors can be divided into a passive and an active group. Both groups can find application in the invention and examples of passive sensors in this connection are optical systems such as binoculars and microscopes, IR viewers. Examples of active sensors are laser radar, radar and sonar sensors and X-ray tomographs. A further example of the last-mentioned group is sensors which operate with incoherent light limited to time gaps, so-called "gated viewing". It is also conceivable to use sensors which consist of intermediate forms of sensor types within a group or between the two groups.

I claim:

1. An apparatus for displaying a three-dimensional image to an observer, comprising:

a first display element being arranged at a distance from the observer;

a second display element being arranged in the field of view between the observer and the first display element in the immediate vicinity of the observer and being carried by the observer to follow movements of the observer;

means for providing synchronization between the first and second display element;

means for generating a primary image with three-dimensional image information; and means for processing said three-dimensional image information on a three-dimensional picture element basis to divide said image information within each said picture element between said first and said second display element, the processed image information being utilized partly by said first display element for displaying a first subset of image information included in the three-dimensional image and partly by said second display element for displaying a second subset of image information included in the three-dimensional image during a characteristic integration time for the observer, whereby the observer with each single eye perceives a three-dimensional image on observing the combined information of the two synchronized display elements in his field of view.

2. Display apparatus according to claim 1, wherein the first display element is set up to display within the field of view of the observer the first subset of the image information divided into a number of image planes arranged in such a manner that they generate a volume image, the pixels of which are located at different distances from the observer.

3. Display apparatus according to claim 2, wherein each image plane is allocated one display ruler.

4. Display apparatus according to claim 3, wherein the second display element is arranged to sweep over an image plane during the integration time of the observer.

5. Display apparatus according to claim 2, wherein each image plane is allocated a two-dimensional display unit in the first display element.

6. Display apparatus according to claim 1, wherein the processing members comprise a frame buffer.

7. Display apparatus according to claim 1, wherein the processing members comprise an image overlay unit for overlaying one or more images, for example a sighting means, on the three-dimensional image.

8. Display apparatus according to claim 1, wherein an object in the physical space is being imaged as primary image, and wherein elements are arranged to sample the image volume in a number of pixels.

9. Display apparatus according to claim 8, wherein the elements for sampling the image volume comprise linear detector arrays.

10. Display apparatus according to claim 8, wherein the elements for sampling the image volume comprise a sweeping obliquely arranged image sensor with sensor elements positioned in a two-dimensional plane which sensor by sweeping through the image volume samples a three-dimensional volume.

11. Display apparatus according to claim 1, wherein the elements for sampling the image volume sample said image volume in a number of planes lying parallel behind one another.

12. Display apparatus according to claim 1, wherein the elements for generating the primary image with three-dimensional information comprise an active sensor.

13. Display apparatus according to claim 12, wherein said active sensor is a radar.

14. Display apparatus according to claim 1, wherein the elements for generating the primary image with three-dimensional information comprise an image generator for synthetic generation of the primary image.

* * * * *